Figure 1:
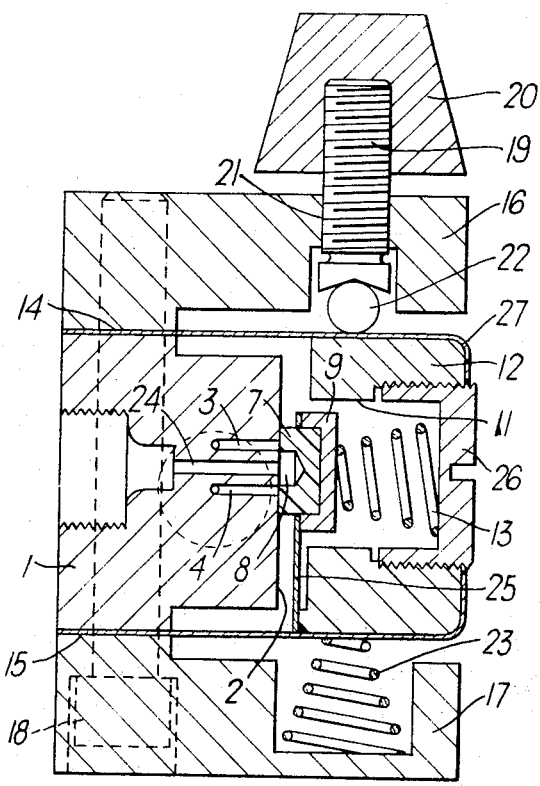

United States Patent [19]
Commarmot

[11] 3,774,639
[45] Nov. 27, 1973

[54] VALVE

[75] Inventor: Roger Commarmot, Lyon, France

[73] Assignee: Rhone-Paulenc S.A., Paris, France

[22] Filed: Feb. 4, 1972

[21] Appl. No.: 223,477

Related U.S. Application Data

[62] Division of Ser. No. 9,320, Feb. 6, 1970, Pat. No. 3,678,236.

[52] U.S. Cl. .......................... 137/625.48, 251/176
[51] Int. Cl. ............................................. F16k 11/02
[58] Field of Search .................. 137/625.48, 625.4, 137/625.41, 625.49, 625.5, 625.26, 625.34; 251/176

[56] References Cited
UNITED STATES PATENTS

| | | | |
|---|---|---|---|
| 3,090,400 | 5/1963 | Broome | 137/625.48 X |
| 3,294,119 | 12/1966 | Hunt | 137/625.48 |
| 2,889,569 | 6/1959 | Riester | 251/176 X |
| 3,589,380 | 6/1971 | Gastinne | 251/176 X |
| 2,625,136 | 1/1953 | Moog, Jr. | 137/625.61 |
| 3,044,480 | 7/1962 | Lee | 137/625.62 X |
| 3,223,122 | 12/1965 | Banker | 137/625.4 |
| 3,452,780 | 7/1969 | Faustini | 137/625.48 |
| 3,460,572 | 8/1969 | Hartman | 137/625.48 |
| 3,521,674 | 7/1970 | Dodson et al. | 137/625.48 |
| 3,570,540 | 3/1971 | McInnes et al. | 137/625.48 |

Primary Examiner—Samuel Scott
Attorney—Stevens, Davis, Miller & Mosher

[57] ABSTRACT

The valve for controlling the flow of a fluid, particularly very small flows, comprising a block having at least one smooth face and at least two ducts extending through the block and terminating in the smooth face in an orifice. A slide is guided for movement substantially parallel to the smooth face and is moved, e.g., by means of a screw or pneumatically. A valve element movable with the slide is urged into sliding contact with the smooth face and a recess in the valve element is dimensioned to overlie and connect at least two of the orifices in at least one position of the slide.

5 Claims, 2 Drawing Figures

VALVE

This is a division of application Ser. No. 9,320, filed Feb. 6, 1970 U.S. Pat. No. 3,674,235, of Jul. 9, 1972.

The present invention concerns a valve for controlling the flow of fluids in liquid or gas form.

The very precise regulation of microflows of fluids or the strict metering of specific quantities of fluids are extremely delicate operations but operations which are often carried out, for example in analytical laboratories. For this purpose, various types of valves are used, but each of them has certain disadvantages.

Regulating valves are easily obstructed by the smallest impurities, and they do not often close in a sealing-tight manner. Furthermore, metering valves do not permit the precise control of small flows, and their design or bulk generally make it necessary to arrange long connecting conduits which present a considerable internal volume.

According to the present invention, there is provided a valve for precisely controlling the flow of a fluid comprising a block having at least one smooth face, at least two ducts in said block, each terminating at said smooth face in an orifice, a slide guided for movement substantially parallel to said smooth face, means for effecting such movement, a valve element movable with said slide and in sliding contact with said smooth face, the valve element overlying all the orifices in all positions of the slide spring means acting between the slide and the valve element to urge the latter against the smooth surface said spring means comprising a leaf spring mounted on said slide, substantially parallel to said smooth face and bearing on the valve element and a coil spring mounted between the slide and the valve element having its axis perpendicular to the smooth face, and a recess in the valve element dimensioned to overlie and connect at least two of the orifices in at least one position of the slide.

Such a valve retains substantially no solid or liquid impurities and permits both the precise regulation of a flow of a pressure and also operation as a two-position valve. The valve may operate reliably, is simple to produce and maintain, and does not require either lubrication or a stuffing-box.

Figure 2:
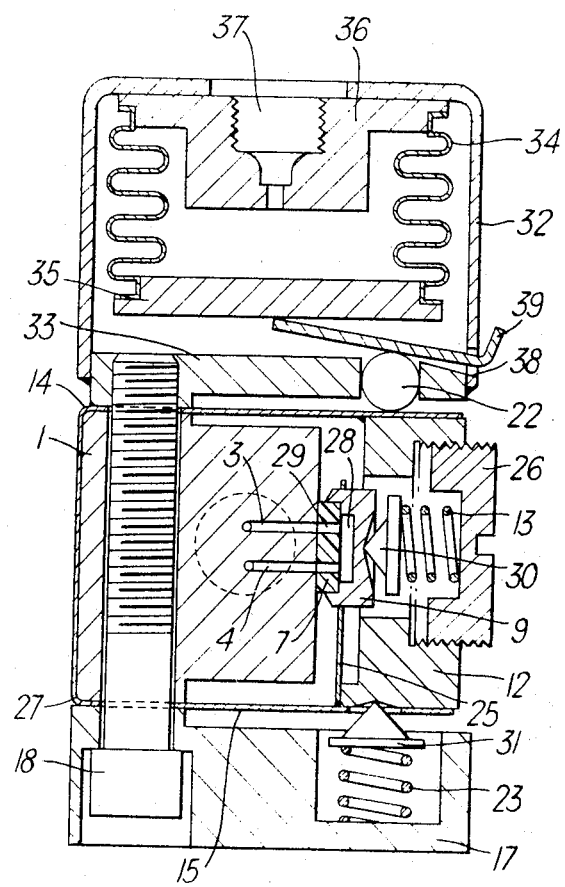

The invention will be better understood from the following detailed description, which is given merely by way of example, reference being made to the accompanying drawings, in which:

FIG. 1 is a sectional elevation of one embodiment of valve according to the invention; and FIG. 2 is a similar view of a second embodiment.

The valve illustrated in FIGS. 1 and 2 is compose of a block 1 made, for example, of stainless steel, which has a smooth, plane face 2. Formed ed in the block are ducts 3 4 and 24 which terminate in adjacent orifices at the face 2. The ducts 3 and 4 open at the other end on the lateral faces of the block in appropriate pipe connections (not shown).

A valve element 7 made, for example, of polytetrafluorethylene, can be moved in sliding contact across the face 2 of the block, the face of the valve element in contact with the block being provided with a recess 8, which can be moved to overlie and provide communication between the orifices at the end of the ducts 3 and 4.

The slide 12 is guided for movement parallel to the face 2 of the block 1 and at a substantially constant distance therefrom, whatever the compression of the spring 13 and whatever the position of the recess 8 of the valve element relatively to the orifices of the ducts 3 and 4, by two flexible and non-extensible blade portions 14 and 15 of a U-shaped flexible member 27. These blades are arranged on either side of the two limits of movement of the valve element and on either side of the slide in planes substantially perpendicular to the axis of displacement of the valve element. These blades are secured at their ends on the one hand to the block 1 against which they are, for example, gripped by parts 16 and 17 by means of the screw 18, and on the other hand to the slide 12 on which they are welded. The cross-section of these blades is calculated so as to ensure the guiding of the cross-member with a very small effort, the parts 1, 16 and 17 being suitably notched to give the flexible blades the necessary freedom of movement. The blades 14 and 15 thus form with the parts 1 and 12 substantially a parallelogram linkage.

Displacement of the valve element 7 relatively to the block 1 is effected by a screwthreaded rod 19 which can be turned by a control knob 20, and rotate within a tapped hole 21 in the part 16. Interposed between the rod 19 and the slide 12 is a ball 22, and spring 23, accommodated in a recess of the part 17, holds the slide 12 against the ball 22 at all times.

The support 9 of the valve element has no direct contact with the slide 12 but is held only by the combination of the axial conical coil spring 13 and a flexible lateral blade or leaf spring 25. The spring 13 bears on the bottom of a plug 26 screwed into the cylindrical hole 11 in the slide 12, this arrangement facilitating the assembly of the valve, and permitting regulation of the compression of the spring 13, to maintain perfect sealing-tightness of the valve. The flexible blade 25 is preferably substantially plane and parallel to the smooth face 2 of the block 1, its ends being secured to the support 9 and the slide 12, e.g., by spot welding.

In operation, when the spring is relaxed, the recess 8 of the valve is situated opposite the ducts 24 only and the ducts 3 and 4 are isolated from one another by the valve elements 7 held by the springs 13 and 25 against the orifices of the ducts 3 and 4. When the knob 20 is turned in the sense to open the the valve, the rod 19 is screwed into the hole 21 and the slide, retained and guided by the flexible blade portions 14 and 15, is displaced parallel to the surface 2, progressively compressing the spring 23. This displacement, by means of a flexible blade 14 and 15, is carried out with minimum friction, i.e., only the friction of the valve element 7 on the block 1. the displacement of the valve element 7 is thus effected regularly without any shocks along the distance determined in accordance with the angle through which the knob 20 has been rotated. The recess 8 unmasks very gradually the orifice of the duct 3 or the orifice of the duct 4, depending on the direction of rotation, and the duct 3 or the duct 4 respectively is brought into communication without the least narrowing of cross-section. Since the flexible blade 25 ensures that the valve element 7 is strictly integral with the slide 12, the alternate displacements of the valve element 7 are effected not only without any shock and very smoothly, but also without hysteresis.

FIG. 2 shows a valve according to the invention equipped with pneumatic control and like parts have been given like reference numerals. Certain parts have had constructional modifications made thereto. Thus the member 7 and the support 9 together form the valve element, the recess of which is formed by a cavity 28 and two passages 29 which can communicate with the ducts 3 and 4. A conical cap 30 transmits the pressure of the spring 13 to the centre of the support 29. Likewise, a cap 31 transmits the pressure of the spring 23 axially to the blade 15 and the slide 12. The blade portions 14 and 15 are united in a single blade 17 arranged and bent around the fixed block 1.

The displacement of the valve element 7 relatively to the block 1 is controlled pneumatically. For this purpose, the valve is surmounted by a cover 32 of pressed sheet metal welded to a plate 33, held to the block 1 by means of a screw 18. The ball 22 is accommodated in an aperture in the plate 33 along the axis of the spring 23. Within the cover 32 there is fixed, for example by welding, a bellows 34 which is closed at its ends by an end wall 35 and by an end piece 36, the latter being formed with a hole 37 screwthreaded to receive a hose connection (not shown). The cover 32 is provided with a side notch 38, in which is engaged the angled portion of a lever 39. The other end of this lever is applied against the centre of the end wall 35, and at an intermediate point it comes into contact with the ball 22.

When the bellows is connected to a source of air under pressure and the air pressure is increased, the bellows expands, displaces the lever 39 which acts on the ball 22 and moves the valve element 7,9. Displacement in the reverse sense takes place, under the action of spring 23, when the pressure decreases. The minimum friction and the strict guiding of the valve element gives this valve a remarkable sensitivity and fidelity. It may be used equally well for metering or for regulating purposes.

Many constructional modifications may be made to the valve according to the invention. Thus, the valve element can be supported only by the lateral blade 25 and without the spring 13. The blades 14, 15 and 25 can be replaced by any equivalent mechanical devices, such as metal rods or sheets or wires, or the blades 14 and 15 can be articulated at their ends. The valve element may be provided with one or more recesses of appropriate shape, for example grooves the width of which is equal to the diameter of a duct. Thus a valve element provided with two identical recesses arranged side by side is suitable for a four-way valve. The parts 1, 16 and 17 may form a single block. The valve according to the invention may be controlled by any appropriate device, for example by mechanical devices constituted by a worm and worm wheel or a cone and a roller, or by any other device, e.g., electromagnetic, hydraulic or electrical.

The valve according to the invention may be constructed by means of any appropriate material normally used, such as metals and alloys, synthetic plastic materials, graphite, ceramic materials or glass. Preferably the block 1 is metallic, for example, being made of stainless steel, and the face 2 is smooth and is preferably plane, ground and lapped. The valve element is preferably formed of a suitable thermoplastic material such as polytetrafluorethylene, polyethylene or a polyamide with which it is possible to incorporate fillers, such as graphite or ground glass. The flexible blades are preferably made of stainless steel, but may be made of any suitable metal or alloy.

The valve described is particularly suitable for regulating or metering very small flows with remarkable precision.

By way of example, a valve as illustrated in FIGS. 1 and 2 was constructed having three aligned ducts of 0.4 mm. diameter which were spaced by 0.4 mm., the valve element 7 having a diameter of 4 mm., with a recess 8 of 1.3 mm. diameter, its depth being 0.5 mm. The dimensions of the other parts of the valve were in the proportions shown in the drawings.

Such valves are particularly suitable for regulatin gas flows of a few cc. per hour. With a valve element made of polytetrafluorethylene with glass filler material, they remain sealing-tight under a pressure of 5 bars at a temperature of 250°C. With a valve element of graphite or ceramic material, they can withstand even higher temperatures Some forms of embodiment remain perfectly sealing-tight under pressures of the order of about a hundred bars. The valve according to the invention may be constructed with materials which have a high resistance to corrosion.

The valves described are particularly suitable for liquids and gases, more particularly moist gases or vapours, presenting a small internal volume to fluids and, in an installation, may be situated directly on the various conduit Since the valve according to the invention does not have a stuffing-box and does not require any lubrication, it is particularly simple to maintain and its operation is very reliable. Advantageously the valve element can be arranged in its support in such a manner that it is easy to replace. The construction of the valve is simple and relatively cheap. Since the only friction is that between the valve element and the smooth face of the block, the effort required to displace the valve element is very small and at the same time the regularity and precision of this displacement avoids any jerky movements.

When liquid or gas flows through an orifice of one of the ducts which is partly blocked by the edge of the recess of the valve element, a throttling occurs which immediately expels any solid and/or liquid particle which might remain attached to this orifice. The orifice, therefore, remains free of any impurities, which contributes to the maintainance of perfect sealing-tightness.

The control of the displacement of the valve element is sufficiently strict to ensure that a valve of this kind can be used equally well either for the sealing-tight opening or closing of a circuit or for the extremely precise regulation of the flow or pressure. A valve of this kind, therefore, can carrying out almost equally well functions which hitherto have been regarded as incompatible.

What is claimed is:

1. A valve for precisely controlling the flow of fluid, said valve comprising, in combination:
   a. a block having at least one smooth face;
   b. means defining at least two ducts in said block, said ducts each terminating at said smooth face in an orifice;
   c. a slide movable with respect to said block;
   d. guide means guiding said slide for movement substantially parallel to said smooth face;
   e. control means for effecting said movement;
   f. a separate valve element movable with said slide and in sliding contact with said smooth face, the valve element overlying all of the orifices in all positions of the slide;

g. a leaf spring mounted on said slide substantially parallel to said smooth face and supporting said valve element;

h. a coil spring mounted between said slide and said valve element with its axis perpendicular to said smooth face, said leaf spring and coil spring effective to urge said valve element against said smooth face; and i. a recess in said valve element dimensioned effective to overlie and connect at least two of said orifices in at least one position of said slide, the flow of liquid from one orifice to another being entirely via said recess.

2. A valve as claimed in claim 1, wherein said control means comprises a screwthreaded member.

3. A valve as claimed in claim 1, wherein said control means comprises a pneumatically operated bellows and a lever interposed between said bellows and said slide.

4. A valve as claimed in claim 1, wherein said guide means comprise two substantially parallel and non-extensible flexible blades connected to said block and said slide in planes substantially perpendicular to the smooth face, the valve element being positioned in said slide at a location between said blades.

5. A valve as claimed in claim 4, wherein said blades are the two legs of a single U-shaped member.

* * * * *

UNITED STATES PATENT OFFICE
CERTIFICATE OF CORRECTION

Patent No. 3,774,639  Dated November 27, 1973

Inventor(s) ROGER COMMARMOT

It is certified that error appears in the above-identified patent and that said Letters Patent are hereby corrected as shown below:

In the heading:

Assignee: change "Rhone-Paulenc S.A." to -- Rhone-Poulenc S.A.--;

Related U.S. Application Data: change "Pat. No. 3,678,236" to -- Pat. No. 3,674,236 --;

Please add the claim for Convention priority:

-- Claims priority, application France, February 7, 1969, No. 69,02908 --

Signed and sealed this 20th day of August 1974.

(SEAL)
Attest:

McCOY M. GIBSON, JR.
Attesting Officer

C. MARSHALL DANN
Commissioner of Patents